United States Patent [19]  [11] 4,087,731
Rhoades  [45] May 2, 1978

[54] CONTROL SYSTEM FOR MOVING A LARGE MACHINE ALONG A SINGLE AXIS

[75] Inventor: John M. Rhoades, Waynesboro, Va.

[73] Assignee: General Electric Company, New York, N.Y.

[21] Appl. No.: 756,025

[22] Filed: Dec. 30, 1976

[51] Int. Cl.² ............................................. G05B 11/32
[52] U.S. Cl. ........................................ 318/625; 318/8; 318/571
[58] Field of Search .................. 318/8, 600, 601, 603, 318/625, 571, 608; 235/151.11

[56] References Cited

U.S. PATENT DOCUMENTS

| | | | |
|---|---|---|---|
| 3,588,660 | 6/1971 | Purkhiser | 318/625 X |
| 3,593,094 | 7/1971 | Katsumaru | 318/8 X |
| 4,008,829 | 2/1977 | Chandra et al. | 318/571 X |

Primary Examiner—B. Dobeck
Attorney, Agent, or Firm—Stephen A. Young; Walter C. Bernkopf; Robert A. Cahill

[57] ABSTRACT

A control system for moving a large machine along a single axis. The control system includes first and second position loop servo systems to drive at least respective first and second motors to move respective first and second sides of the machine in the direction of the single axis. The control system is comprised of means responsive to position error signals generated by each position loop servo system for generating a difference error signal that is indicative of the difference between the actual position of each respective side of the machine along the single axis, and means for coupling the difference error signal to means for driving at least one of the motors for causing a change in movement of that motor in a direction to move each side of the machine toward the same actual position while at the same time causing the difference error signal to be reduced toward zero.

3 Claims, 1 Drawing Figure

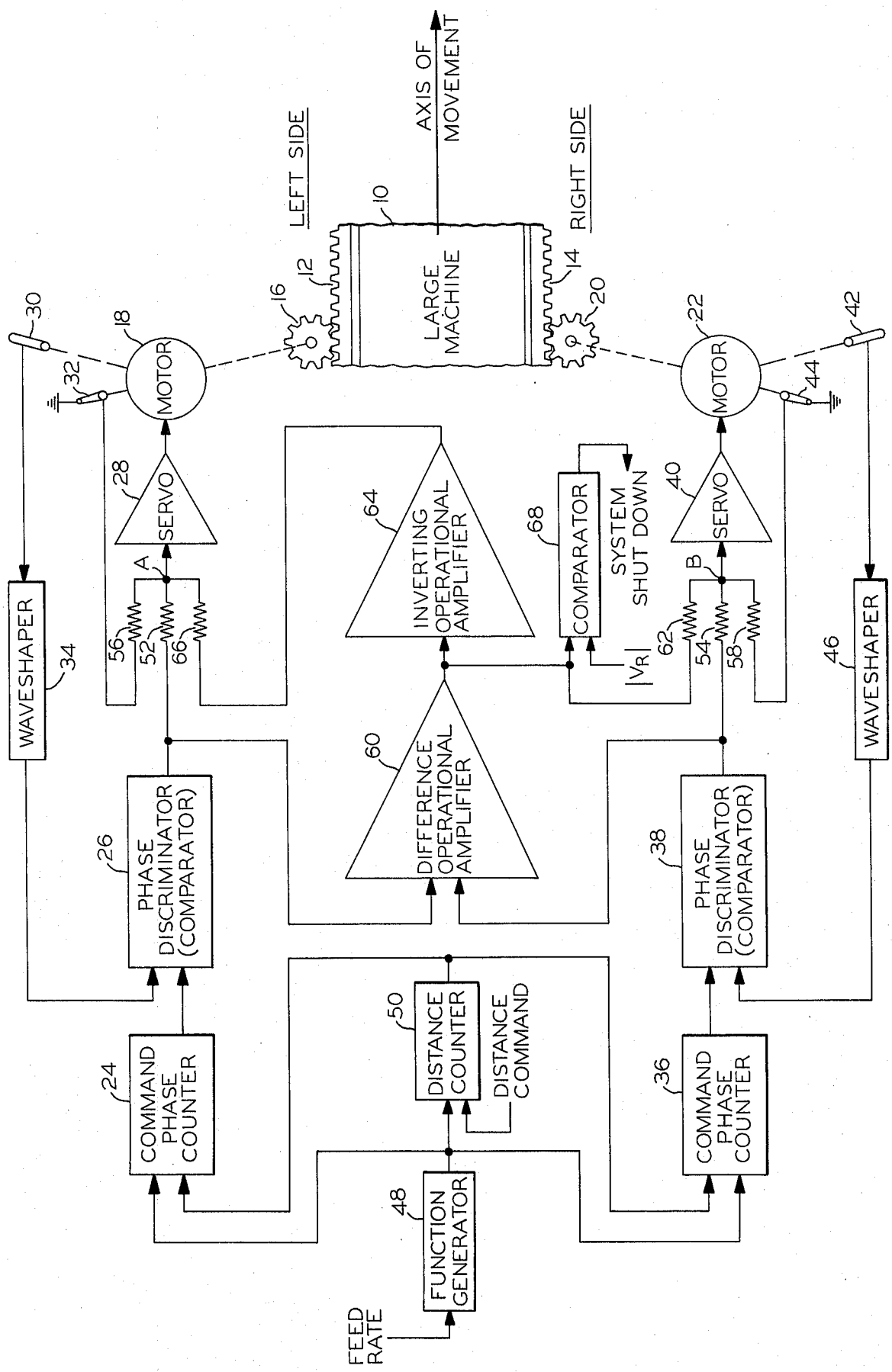

CONTROL SYSTEM FOR MOVING A LARGE MACHINE ALONG A SINGLE AXIS

BACKGROUND OF THE INVENTION

1. Field of the Invention

This invention relates to position loop control systems, and, more particularly, to numerical control systems for moving a large machine along a single axis.

2. Description of the Prior Art

Position loop numerical control systems, more particularly phase analog position loop control systems, have been used to control the movement of large machines along a single axis. Each side of the large machine would be attached to a rack wherein each rack is driven by a pinion that is mechanically coupled to a motor. Each motor is driven by a separate phase analog position loop control system, wherein the same commanded position signal is used to command movement of each side of the machine. Transducers, used to detect the actual position of the motor and/or machine, are provided to feed back a signal that is indicative of the actual position of each side of the machine. The commanded position signal is then compared with each signal indicative of the actual position of each respective side of the machine. The comparison results in the generation of position error signals which are applied to respective servo amplifiers to cause each side of the machine to be driven toward the commanded position. In view of the different dynamic characteristics of each phase analog loop, the motors being driven, the mechanical parts being moved, etc., each side of the machine does not ordinarily move at the same pace toward the commanded position. It would be undesirable to allow one side to move much faster than the other side in view of the great stress it could cause to the control system, to the machine being moved, and to the mountings for the machine. It would thus be desirable to monitor the actual movement of each side of the machine. The system can then be shut down if the difference in position between each side becomes greater than an allowable amount. Additionally, the drive to the slower moving side can be increased, and/or the drive to the faster moving side can be decreased. In the past, the only way in which this object could be carried out would be to use separate position transducers for each side of the machine, and provide a phase discriminator, which would include a digital to analog converter, for generating an output signal having a magnitude indicative of the difference in actual position between each side of the machine and a polarity indicative of which side of the machine has moved ahead of the other side. The cost of this circuitry is almost as great as that required to provide a completely separate phase analog position loop system.

OBJECT OF THE INVENTION

It is therefore an object of this invention to provide a more direct and simple way of obtaining a signal indicative of the difference between the actual position of each side of a large machine being moved along a single axis, whereby this simply obtained difference signal could be used to cause each side of the machine to be as close to the same actual position as possible while the machine is moving toward its commanded position.

This and other objects of the invention will be pointed out hereinafter.

SUMMARY OF THE INVENTION

According to a broad aspect of the invention, there is provided a control system for moving a large machine along a single axis. The control system includes first and second position loop servo systems to drive at least respective first and second motors to move respective first and second sides of the machine in the direction of the single axis. The control system further includes means responsive to position error signals generated by each position loop servo system for generating a difference error signal that is indicative of the difference between the actual position of each respective side of the machine in the direction of the single axis, and means for coupling the difference error signal to means for driving at least one of the motors for causing a change in movement of that motor in a direction to move each side of the machine toward the same actual position, and at the same time to cause the difference error signal to be reduced toward zero.

The control system is further comprised of means for inverting the polarity of the difference error signal, and means for coupling the inverted difference error signal to the drive means for the other of the motors for causing a change in movement of that other motor in a direction to cause an increase in the relative movement of each side of the machine toward the same actual position so as to cause the difference error signal to be reduced toward zero more quickly. The control system additionally includes means responsive to the difference error signal and to a magnitude reference signal $|V_R|$ that is indicative of the minimum impermissible difference in actual positions of each side of the machine for generating a signal to cause the shutdown of the control system when the difference error signal is at least equal to the magnitude reference signal $|V_R|$.

DESCRIPTION OF THE DRAWING

The FIGURE is a block diagram of a control system for moving a large machine along a single axis in accordance with the invention.

DESCRIPTION OF THE PREFERRED EMBODIMENT

Referring now to the FIGURE, the invention will now be explained. As shown in the FIGURE, a large machine 10 is required to be moved in the indicated direction along a single axis. This machine can be so large that it cannot be reliably moved along this single axis using a single drive. Therefore, in accordance with the invention, the machine could be mounted on rails which are attached to respective racks 12 and 14, wherein, for purposes of explaining this invention, rack 12 will be considered to be located along the left side of the machine, while rack 14 will be considered located along the right side of the machine. Rack 12 is mechanically coupled to a pinion 16 that is attached to and driven by an output shaft of a motor 18, while rack 14 is mechanically engaging a pinion 20 that is attached to and driven by an output shaft of a motor 22.

Thus, as it can be seen, in order to move the large machine in the direction of the indicated axis of movement, left side motor 18 and right side motor 22 will necessarily be driven by separate position loop servo systems, and, in this example, each position loop servo system is comprised of a phase analog position loop system. The left side position loop system is comprised of a command phase counter 24, a phase discriminator 26, a servo amplifier 28, a resolver feedback element 30, a DC tachometer 32 and a wave shaper 34, while the right side position loop servo system is comprised of a command phase counter 36, a phase discriminator 38, a servo amplifier 40, a resolver feedback element 42, a DC tachometer 44 and a wave shaper 46. Each command phase counter receives desired position command signals from the combination of a function generator 48 and a distance counter 50 so that the commanded input to each command phase counter is identical. A velocity or feedrate signal is fed to the function generator and a final distance command signal is received by the distance counter from a standard numerical input data source, not shown. It should be understood that the basic operation of the function generator, the distance counter and the remainder of the right and left side position loop servo systems are more fully described in U.S. Pat. Nos. 3,173,001; 3,519,904; and 3,657,525, all assigned to the same assignee of the present invention. Furthermore, the operation and description of the function generator, distance counter, command phase counters, phase discriminators, servos and resolvers are described in greater detail within U.S. Pat. No. 3,173,001, while a further description and operation of the command phase counters and wave shapers are also provided within U.S. Pat. No. 3,519,904.

However, to aid in understanding the present invention, the following brief explanation of the above referred to position loop systems will be provided. In response to signals from the function generator and the distance counter, command phase counters 24 and 36 generate a square wave signal, the phase of which is indicative of the desired commanded position of the machine at that moment in time. Resolvers 30 and 42 produce respective signals that are fed to respective wave shapers 34 and 46 to produce square wave signals whose phase are indicative of the actual position of each respective side of the machine. Phase discriminator 26 receives the respective signals from command phase counter 24 and wave shaper 34, and produces an output DC analog position error signal which is indicative of the difference between the actual and commanded positions for the left side of the machine. Similarly, phase discriminator 38 receives the respective signals from command phase counter 36 and wave shaper 46, and produces an output DC analog position error signal which is indicative of the difference between the actual and commanded positions for the right side of the machine. The position error signals produced at the outputs of discriminators 26 and 38 are applied to respective summing junctions A and B via resistors 52 and 54. Similarly, respective DC analog signals are obtained from respective tachometers 32 and 44, which tachometers are coupled to the output shafts of respective motors 18 and 22 to provide respective signals which are proportional to or indicative of the rate of movement or actual velocity of respective motors 18 and 22 and respective left and right sides of the machine. The generated velocity feedback signals from respective tachometers 32 and 44 are also applied to respective summing junctions A and B via respective resistors 56 and 58. The summed signals at summing junctions A and B are applied to respective servos 28 and 40 to drive respective motors 18 and 44 to cause the respective sides of the large machine to move toward the desired commanded position. It should be noted that the actual velocity feedback signals from the tachometer are provided so as to stabilize and improve the accuracy of the servo amplifiers and motors.

At this point, it should be noted that the gain within the respective phase discriminators 26 and 38 are adjusted so that when the phase of the actual position signals applied to the respective inputs of phase discriminators 26 and 38 are identical, the DC output position error signal from each phase discriminator will be equal to each other. Thus, inasmuch as the phase of the commanded position signals which are applied to the respective inputs of phase discriminators 26 and 38 are always identical, it has been found that the difference between the position error signals produced at the outputs of phase discriminators 26 and 38 are indicative of the difference between the actual positions of the respective left and right sides of the machine. Thus, in accordance therewith, a difference operational amplifier 60, which is responsive to the respective position error signals produced by respective phase discriminators 26 and 38, is used to provide a means for generating a difference error signal at its output, which difference error signal is indicative of the difference between the actual position of each of the respective sides of the machine in the direction of the indicated axis of movement. Assuming that the left side of the machine is moving toward the commanded position slower than the right side, the position error signal at the output phase discriminator 26 will be greater than the position error signal at the output of discriminator 38. The resulting difference error signal at the output of operational amplifier 60 will not only have a magnitude indicative of the difference between the actual position of each respective side of the machine, but will also, by way of example, have a negative polarity. The negative difference error signal will thus be applied to summing junction B via a resistor 62 to cause a decrease in the summed signal applied to servo 40. This will cause a change, i.e., reduction in movement, of motor 22, thereby ultimately causing the difference error signal to be reduced toward zero as each side of the machine moves toward the same actual position.

In order to increase the response time within which each side of the machine moves toward the same actual position, an inverting operational amplifier 64 is used to provide a means for inverting the polarity of the difference error signal from difference operational amplifier 60, such that when the left side of the machine is moving slower than the right side, a positive polarity (inverted) difference error signal is applied to summing junction A via a resistor 66 to cause an increase in the signal applied to servo 28. This causes an increase in movement of motor 18, which results in an increase in the relative movement of each side of the machine toward the same actual position, while the difference error signal is reduced toward zero more quickly.

Furthermore, in order to prevent the difference in the actual position between each side of the machine from exceeding a permissible amount, a comparator 68 is used to provide a means responsive to the difference error signal for generating a signal to cause the shut down of the control system when the difference in actual position between each side of the machine exceeds the designated permissible amount. In the illustrative example shown in this embodiment, comparator 68 receives the difference error signal and a magnitude reference signal $|V_R|$, which reference signal in this instance is indicative of the minimum impermissible difference in actual position between each of the sides of the machine, for generating a system shutdown signal at the output of comparator 68 when the difference error signal is equal to or greater than the magnitude reference signal $|V_R|$. This system shutdown signal can be used to cause the control system to be disconnected from a source of power in order to achieve shutdown.

Thus, in accordance with the above teachings of this invention, the difference in the actual position of each side of a large machine can be made as small as possible without requiring the use of a separate phase analog servo loop. Additionally, in accordance with the teachings of this invention, the control system can be easily shut down if the difference in actual position between the respective sides of the machine ever increases beyond a designated permissible amount. While the output of difference operational amplifier 60 is shown electrically coupled to summing junction B via resistor 62, and the inverted difference error signal from inverting operational amplifier 64 is shown electrically coupled to summing junction A via resistor 66, it should be understood that the output from difference operational amplifier 60 would have been electrically coupled to summing junction A via resistor 66, and the output from inverting operational amplifier 64 would have been coupled to summing junction B via resistor 62, if the polarity of the difference error signal at the output of difference operational amplifier 60 were made positive when the position error signal at the output of phase discriminator 26 is of a greater magnitude than the position error signal at the output of phase discriminator 38.

It should additionally be noted that in the embodiment shown in FIG. 1, when the position error signal at the output of phase discriminator 26 is less in magnitude than the position error signal at the output of phase discriminator 38, then the difference error signal at the output of difference operational amplifier 60 has a positive polarity, and the inverted difference error signal at the output of inverting operational amplifier 64 has a negative polarity.

Although this invention has been described with reference to a specific embodiment thereof, numerous modifications are possible without departing from the invention, and it is desirable to cover all modifications falling within the spirit and scope of this invention.

What I claim as new and desire to secure by Letters Patent of the United States is:

1. A control system for driving at least first and second motors to move a large machine along a single axis, said control system including at least first and second position loop servo systems driving the respective first and second motors to move respective first and second sides of the machine in the direction of the single axis, each position loop servo system comprising:
    (a) means for generating a first signal indicative of the commanded position of movement that the machine is to be moved by the respective motor;
    (b) means for generating a second signal indicative of the actual position of the respective side of the machine moved by that motor;
    (c) means responsive to the first and second signals for generating a signal indicative of the position error between the actual and commanded positions of the respective side of the machine; and
    (d) means responsive to the position error signal to generate a signal for driving the respective motor for moving the respective side of the machine toward the commanded position;
said control system further comprising:
    (A) means responsive to the position error signals generated by each said position loop servo system for generating a difference error signal indicative of the difference between the actual position of each respective side of the machine along the single axis; and
    (B) means for coupling the difference error signal to said driving means for one of the motors for causing a change in movement of that motor in a direction to move each side of the machine toward the same actual position, whereby to cause the difference error signal to be reduced toward zero.

2. A control system according to claim 1, further comprising:
    (a) means for inverting the polarity of the difference error signal; and
    (b) means for coupling the inverted difference error signal to said driving means for the other of the motors for causing a change in movement of that other motor in a direction to cause an increase in the relative movement of each side of the machine toward the same actual position, whereby to cause the difference error signal to be reduced toward zero more quickly.

3. A control system according to claim 1, further comprising means responsive to the difference error signal for generating a signal to cause the shutdown of the control system when the difference in actual position between each side of the machine exceeds a designated permissible amount.

* * * * *